M. J. GRIFFITH.
SEPTIC TANK.
APPLICATION FILED OCT. 2, 1919.
1,349,452.
Patented Aug. 10, 1920.
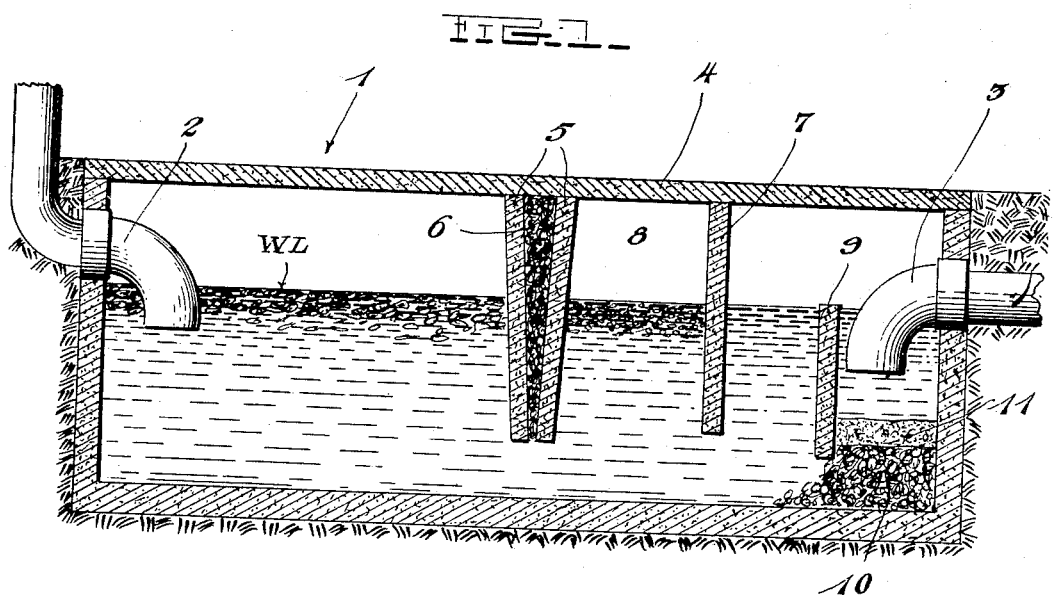
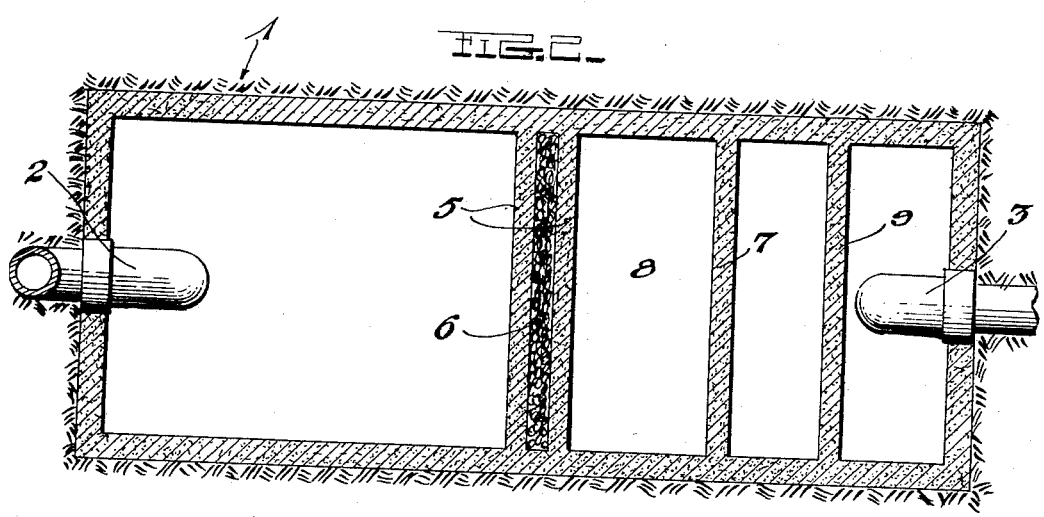
Witness
George W. Garwood
Inventor
M. J. Griffith
By H. R. Willson &co
Attorneys

UNITED STATES PATENT OFFICE.

MELVIN JAMES GRIFFITH, OF BARBERTON, OHIO.

SEPTIC-TANK.

1,349,452.

Specification of Letters Patent.　Patented Aug. 10, 1920.

Application filed October 2, 1919. Serial No. 327,917.

*To all whom it may concern:*

Be it known that I, MELVIN JAMES GRIFFITH, a citizen of the United States, residing at Barberton, in the county of Summit and State of Ohio, have invented certain new and useful Improvements in Septic-Tanks; and I do declare the following to be a full, clear, and exact description of the invention, such as will enable others skilled in the art to which it appertains to make and use the same.

This invention relates to improvements in septic tanks, such as are used at suburban and country houses which are unsewered.

The primary object of the invention is to provide a sanitary septic tank which is provided with means for entirely consuming and disposing of the human excreta or discharge of the bowels, the construction being such that it will be water-tight, light-proof, fly-proof, odorless and self-cleaning, without the use of any chemicals whatever.

Another object of the invention is to provide a septic tank which is provided with a brooding pocket or compartment for the septic bacteria or scavenger bug which will decidedly multiply the bacteria and thus cause effective and rapid decomposition and fermentation within the tank of the organic matter deposited therein.

A further object of the invention is to provide a septic tank which is simple in construction, effective in use, strong, and durable and inexpensive both to the manufacturer and the user.

Other objects and advantages of the invention will become apparent during the course of the following description.

In the accompanying drawings forming a part of this specification and in which like numerals are employed to designate like parts throughout the same;

Figure 1 is a longitudinal central sectional view, partly in elevation, of a tank constructed in accordance with my invention.

Fig. 2 is a horizontal section thereof.

In the drawings, wherein for the purpose of illustration is shown a preferred embodiment of my invention the numeral 1 designates as a whole the septic tank which is preferably rectangular in configuration and is made of cement. This tank is provided with the usual downturned inlet pipe 2 at one end, by means of which sewage may be gathered from one or many sources and delivered to the interior of the tank below the normal water line. The opposite end of the tank is provided with a similar outlet or discharge pipe 3, also having a downturned inner end extending below the water line. Hence, it will be seen that when the tank is in operation, foul gases will be prevented from escaping and a positive seal will be had. The tank, as is usual, is adapted to contain water, and when filled for operation the normal water level or line is slightly above the center, (the normal water line being here designated by the letters W. L.). In order to permit access to the interior of the tank for cleaning and repairing, I provide a removable top or cover 4. Integrally cast with the side walls, and parallel with the end walls of the tank, are a pair of converging partitions 5 which form a V-shaped brooding pocket or compartment for the septic bacteria or scavenger worms. This pocket is open at the top to permit it to be filled with horse manure 6. It has been found that such animal manure will decidedly increase the growth of the bacteria, and the greater the amount of bacteria, the more rapid the decomposition of the organic matter will be, hence, the provision of this brooding pocket. The lower portion of the brooding pockets extends below the water line, and is open to permit the entrance of the water therein which will mingle with the manure 4 and cause a more rapid breeding of the bacteria. Between the partitions 5 and one end wall of the tank is a third dividing plate or partition 7 which is of a height equal to the partitions 5 and extends substantially below the water line. This partition serves to form a compartment 8 between itself and the V-shaped brooding pocket, for the young bacteria to thrive in. This partition 7 will prevent, as much as possible, excessive disturbance of the young bacteria in the compartment 8. A fourth partition 9 is disposed between the plate 7 and the end of the tank and is adjacent to and parallel with the end wall. The lower edge of this partition is spaced from the bottom of the tank to permit the passage of the effluent liquid therebeneath. A quantity of filtering material including manure 10, and sand and gravel 11 is placed between the end wall and lower portion of the partition 9 and rests on the bottom of the tank 1, and the effluent liquid is caused to pass through this filtering material and is thereby clarified. The upper edge of partition 9 is disposed in an approximate plane with the normal water line and thus serves to permit the passage of the liquid over its top edge when the passage beneath is stopped-up or obstructed.

In operation of the device, it will be seen that the fecal matter will enter the tank 1 through the pipe 2 and be discharged below the water line in said tank, and above the bottom of the tank and the solid matter will rise and float on the surface of the liquid between the inlet pipe 2 and partitions 5, which we will here designate as compartment A. Great quantities of septic bacteria or scavenger bugs will readily breed in the brooding pocket and the young bacteria will thrive in the compartments 8. Because of the excessive amount of bacteria which are born with the help of the brooding pocket it will be seen that rapid decomposition of the fecal matter in compartment A will result. The discharging liquid then passes beneath the partitions 5 and 7 and thence through the filtering material 10 and 11 out through the discharge pipe 3, which leads to a suitable sewer farm or other place of deposit.

This septic tank is preferably made of one cast of concrete by a special mold, and when the mold is removed the inner walls are carefully treated with a cement filler, thus making it water-tight, fly-proof, odorless and self-cleaning, without the use of any chemicals.

It is to be understood that the form of my invention herein shown and described is to be taken as a preferred example of the same, and that various changes in the shape, size, and arrangement of parts may be resorted to without departing from the spirit of the invention or the scope of the subjoined claims.

Having thus described my invention, I claim:—

1. A septic tank adapted to contain water including inlet and outlet openings, and a V-shaped bacteria brooding pocket in said tank, said pocket being open at its bottom which is disposed below the normal water line to permit the water to circulate therethrough.

2. A septic tank comprising a substantially rectangular water box having inlet and outlet openings at its opposite ends, said box also being provided with a plurality of partitions, two of said partitions being adjacent the center of the box and converging from the top toward the bottom, the height of each being such as to permit them to extend below the surface of the water, a third partition of approximately the same height as the converging partitions, said third partition being disposed between the converging partitions and one end of the water box, and a fourth partition of less height than the third partition disposed between the said third partition and the end of the water box.

3. A septic tank comprising a hollow body to contain liquid, a removable cover therefor, a bacteria brooding pocket in said body, being made up of a pair of transverse partitions arranged in said body and extending from the top thereof to a point adjacent the bottom, the lower ends of said partitions being slightly spaced from each other to permit the passage of the liquid between the partitions, so that the manure in the pocket will be saturated, said cover closing the upper end of the pocket, at which end the manure is put in.

In testimony whereof I have hereunto set my hand.

MELVIN JAMES GRIFFITH.